(12) United States Patent
Kunimune et al.

(10) Patent No.: US 10,941,304 B2
(45) Date of Patent: Mar. 9, 2021

(54) METAL POWDER SINTERING PASTE AND METHOD OF PRODUCING THE SAME, AND METHOD OF PRODUCING CONDUCTIVE MATERIAL

(71) Applicant: NICHIA CORPORATION, Anan (JP)

(72) Inventors: Teppei Kunimune, Tokushima (JP); Masafumi Kuramoto, Tokushima (JP)

(73) Assignee: NICHIA CORPORATION, Anan (JP)

( * ) Notice: Subject to any disclaimer, the term of this patent is extended or adjusted under 35 U.S.C. 154(b) by 517 days.

(21) Appl. No.: 15/477,868

(22) Filed: Apr. 3, 2017

(65) Prior Publication Data

US 2017/0283624 A1    Oct. 5, 2017

(30) Foreign Application Priority Data

Apr. 4, 2016  (JP) .............................. JP2016-075314

(51) Int. Cl.
| | | |
|---|---|---|
| C09D 5/24 | (2006.01) | |
| B22F 9/30 | (2006.01) | |
| B22F 1/00 | (2006.01) | |
| C09D 7/40 | (2018.01) | |
| H01B 1/22 | (2006.01) | |

(52) U.S. Cl.
CPC .............. *C09D 5/24* (2013.01); *B22F 1/0055* (2013.01); *B22F 1/0074* (2013.01); *B22F 9/30* (2013.01); *C09D 7/68* (2018.01); *H01B 1/22* (2013.01); *B22F 2201/03* (2013.01); *B22F 2201/50* (2013.01); *B22F 2301/255* (2013.01); *B22F 2998/10* (2013.01)

(58) Field of Classification Search
None
See application file for complete search history.

(56) References Cited

U.S. PATENT DOCUMENTS

| | | |
|---|---|---|
| 2008/0146680 A1 | 6/2008 | Sato |
| 2008/0160183 A1 | 7/2008 | Ide et al. |
| 2009/0236567 A1 | 9/2009 | Ogi et al. |
| 2010/0006002 A1 | 1/2010 | Sato et al. |
| 2010/0025639 A1 | 2/2010 | Ogi et al. |
| 2010/0101637 A1 | 4/2010 | Yamasaki et al. |
| 2010/0243967 A1 | 9/2010 | Hisaeda et al. |
| 2010/0283013 A1 | 11/2010 | Sato et al. |
| 2010/0288159 A1 | 11/2010 | Sato et al. |
| 2011/0042447 A1 | 2/2011 | Komatsu |
| 2011/0253949 A1 | 10/2011 | Kaneda et al. |
| 2012/0168692 A1 | 7/2012 | Son, II et al. |
| 2012/0177897 A1 | 7/2012 | Jablonski et al. |
| 2012/0298009 A1 | 11/2012 | Endoh et al. |
| 2013/0168437 A1 | 7/2013 | Miyairi et al. |
| 2014/0306167 A1 | 10/2014 | Terao et al. |
| 2015/0218391 A1 | 8/2015 | Takahashi et al. |
| 2015/0231698 A1 | 8/2015 | Kurihara et al. |
| 2015/0353804 A1 | 12/2015 | Ghosal et al. |
| 2016/0136763 A1 | 5/2016 | Endoh et al. |
| 2017/0028477 A1* | 2/2017 | Setna ...................... B22F 1/025 |
| 2017/0033073 A1* | 2/2017 | Ghoshal .................. H01L 24/13 |
| 2017/0077057 A1 | 3/2017 | Endoh et al. |

FOREIGN PATENT DOCUMENTS

| | | |
|---|---|---|
| JP | 2006-97116 A | 4/2006 |
| JP | 2006-124787 A | 5/2006 |
| JP | 2007-84860 A | 4/2007 |
| JP | 2007-200775 A | 8/2007 |
| JP | 2008-166086 A | 7/2008 |
| JP | 2008-255370 A | 10/2008 |
| JP | 4247801 B2 | 4/2009 |
| JP | 2009-138243 A | 6/2009 |
| JP | 4347381 B2 | 10/2009 |
| JP | 4414145 B2 | 2/2010 |
| JP | 2011-40189 A | 2/2011 |
| JP | 2011-68988 A | 4/2011 |
| JP | 2011-80147 A | 4/2011 |
| JP | 4756163 B2 | 8/2011 |
| JP | 4870223 B1 | 2/2012 |
| JP | 4928639 B2 | 5/2012 |
| JP | 5005362 B2 | 8/2012 |
| JP | 2012-191238 A | 10/2012 |
| JP | 5064423 B2 | 10/2012 |
| JP | 5085372 B2 | 11/2012 |
| JP | 5092630 B2 | 12/2012 |
| JP | 5108502 B2 | 12/2012 |
| JP | 2013-1966 A | 1/2013 |

(Continued)

OTHER PUBLICATIONS

Office Action dated Aug. 29, 2019, in Japanese Patent Application No. 2016-075314.
Japanese Provision by a Third Party of Relevant Information for Japanese Application No. 2016-75314, dated Feb. 27, 2018.
Japanese Provision by a Third Party of Relevant Information for Japanese Application No. 2016-75314, dated Feb. 28, 2018.

*Primary Examiner* — George Wyszomierski
(74) *Attorney, Agent, or Firm* — Birch, Stewart, Kolasch & Birch, LLP

(57) ABSTRACT

There is a problem that when a silver powder sintering paste that is substantially free from resin is used, an organic solvent used as a dispersion medium bleeds, which results in contamination and wire bonding defects. In order to solve the problem, provided is a metal powder sintering paste that contains, as a principal component, silver particles having an average particle diameter (a median diameter) of 0.3 μm to 5 μm and further contains an anionic surfactant but is substantially free from resin.

25 Claims, No Drawings

(56) References Cited

FOREIGN PATENT DOCUMENTS

| | | |
|---|---|---|
| JP | 2013-36057 A | 2/2013 |
| JP | 2013-37773 A | 2/2013 |
| JP | 5139659 B2 | 2/2013 |
| JP | 5164239 B2 | 3/2013 |
| JP | 5252843 B2 | 7/2013 |
| JP | 2013-151753 A | 8/2013 |
| JP | 2013-177688 A | 9/2013 |
| JP | 5301385 B2 | 9/2013 |
| JP | 2013-216928 A | 10/2013 |
| JP | 2013-216931 A | 10/2013 |
| JP | 5332625 B2 | 11/2013 |
| JP | 2014-40630 A | 3/2014 |
| JP | 2014-51590 A | 3/2014 |
| JP | 5431073 B2 | 3/2014 |
| JP | 5453813 B2 | 3/2014 |
| JP | 5486868 B2 | 5/2014 |
| JP | 5558547 B2 | 7/2014 |
| JP | 5572712 B2 | 8/2014 |
| JP | 5632852 B2 | 11/2014 |
| JP | 2015-4105 A | 1/2015 |
| JP | 5778494 B2 | 9/2015 |
| JP | 2015-206087 A | 11/2015 |
| JP | 2015-225842 A | 12/2015 |
| JP | 2016-54098 A | 4/2016 |
| JP | 2017-179403 A | 10/2017 |
| WO | WO 2008/038534 A1 | 4/2008 |
| WO | WO 2008/038535 A1 | 4/2008 |
| WO | WO 2008/084866 A1 | 7/2008 |
| WO | WO 2009/054453 A1 | 4/2009 |
| WO | WO 2009/087918 A1 | 7/2009 |
| WO | WO 2009/087919 A1 | 7/2009 |
| WO | WO 2009/090767 A1 | 7/2009 |
| WO | WO 2010/073705 A1 | 7/2010 |
| WO | WO 2012/147945 A1 | 11/2012 |
| WO | WO 2013/073607 A1 | 5/2013 |
| WO | WO 2015/198022 A1 | 12/2015 |

* cited by examiner

METAL POWDER SINTERING PASTE AND METHOD OF PRODUCING THE SAME, AND METHOD OF PRODUCING CONDUCTIVE MATERIAL

BACKGROUND OF THE INVENTION

1. Field of the Invention

The present disclosure relates to a metal powder sintering paste, a method of producing the same, and a method of producing a conductive material.

2. Description of Related Art

Conventionally, in a power semiconductor device or a light-emitting device that has a light emitting element as a light source, it has been known that a metal powder sintering paste in which metal particles are dispersed in a dispersion medium such as an organic solvent is used when, for example, a power semiconductor element is placed on a mounting member. A metal powder sintering paste is placed between a mounting member and, for example, a power semiconductor element, and heating them at around 200° C. allows the metal particles in the metal powder sintering paste to sinter to one another and thereby they are joined together.

Furthermore, as a method of joining a light emitting element and a mounting member together, a method has been known in which an adhesive containing a resin or a lead-free solder containing eutectic crystals used therein is placed between a light emitting element and a mounting member.

However, since the lead-free solder generally has a melting point of at least 300° C., the member might be damaged due to member deterioration caused by heating at a high temperature or stress caused by the difference in coefficient of thermal expansion between a substrate and the member at the time of cooling after they are joined. Therefore, in the method using a lead-free solder, the options of usable members can sometimes be limited.

In a metal powder sintering paste, when, for example, silver is used as the metal powder, although silver has a melting point of approximately 962° C., which becomes the theoretical heat resistance limit, joining is carried out by heating at around 200° C. Therefore, the metal powder sintering paste is more advantageous in terms of joining temperature and heat resistance of the light-emitting device to be obtained, as compared to the lead-free eutectic crystal solder containing eutectic crystals used therein.

Furthermore, in a metal powder sintering paste, when gold is not contained as the metal powder, it is less expensive as compared to a gold-tin eutectic crystal solder that is often used for mounting a light emitting element.

There are some metal powder sintering pastes that contain resins. However, from the perspectives that sintering requires a high temperature and a resin component or the volatile portion of the resin contaminates peripheral members, the better ones are those that are free from resin and contain a volatile organic solvent as a dispersion medium.

As compared to a method using an adhesive containing resin, a method using a metal powder sintering paste is excellent in terms of the heat resistance and heat dissipation of a light-emitting device obtained thereby since resin degradation does not occur.

A method of producing a metal member joined body using a material for joining a metal member as a metal powder sintering paste is known, wherein the material for joining a metal member is, for example, in the form of a paste composed of heat sinterable metal particles and a flux and becomes a porous sintered material having a melting point equivalent to that of said metal particles when being heated to be sintered (for example, JP5301385B). Specifically, this method is a method of producing a metal member joined body, wherein the method includes interposing a paste-like material composed of silver particles or copper particles (A) and a liquid material (B) between a plurality of metal members, heating them at a temperature between 200° C. and 400° C. to sinter the silver particles or copper particles (A) to one another to become a porous sintered material, and thereby joining the plurality of metal members to each other, the silver particles or copper particles (A) have an average particle diameter (a median diameter D50) of 0.2 μm to 10 μm and a melting point higher than 400° C. and have heat sinterability, and the liquid material (B) is composed of (b) an oxide film removal activator, namely, hydrochloride salt or bromate salt of amines, carboxylic acid, or organic halide, (c) a thixotropic agent, and (d) a solvent, or is composed of (b) an oxide film removal activator, namely, hydrochloride salt or bromate salt of amines, carboxylic acid, or organic halide, and (d) a solvent, and the porous sintered material has a melting point equivalent to that of the silver particles or copper particles (A) and a porosity at cross-section of 5 to 50% by area.

Furthermore, as a metal powder sintering paste, a metal particulate dispersion also has been known in which metal particulates with a dispersant adsorbing on the surfaces thereof are dispersed in a dispersion medium, said dispersant having at least one of a carboxyl group and a hydroxy group in its molecule, and said dispersion medium having a dielectric constant of at least 12.0 (JP2007-200775A).

Furthermore, as a metal powder sintering paste, a metal particulate dispersing liquid has been known in which metal particulates with the surfaces thereof being coated with fatty acid and aliphatic amine are dispersed in a hydrophobic solvent containing a fatty acid derivative added thereto, the fatty acid derivative being fatty acid methyl ester or fatty acid ethyl ester having 12 to 20 carbon atoms (JP5778494B).

A volatile organic solvent that is used for metal powder sintering pastes has a lower viscosity than that of an adhesive containing resin. Therefore, fine irregularities of the substrate-side electrode surface to be joined often cause an organic solvent component to wet/spread. The wetting/spreading of the organic solvent component is a bleeding phenomenon caused by a capillary phenomenon. This causes bleeding in an unexpected portion in the substrate, which causes the organic solvent to leak onto the substrate bottom surface during the process or results in wire bonding defects due to contamination.

SUMMARY OF THE INVENTION

Therefore, the present disclosure provides a metal powder sintering paste that prevents bleeding from occurring, and a method of producing the same, as well as a method of producing a conductive material using the metal powder sintering paste.

A metal powder sintering paste according to an embodiment of the present disclosure contains, as a principal component, silver particles having an average particle diameter (a median diameter) of 0.3 μm to 5 μm and further contains an anionic surfactant but is substantially free from resin.

A method of producing a metal powder sintering paste according to an embodiment of the present disclosure includes mixing an anionic surfactant with silver particles having an average particle diameter (a median diameter) of 0.3 μm to 5 μm, wherein substantially no resin is mixed together.

A method of producing a conductive material according to an embodiment of the present disclosure includes a step of calcining the metal powder sintering paste.

The metal powder sintering paste of the present disclosure can prevent bleeding from occurring during heating.

DETAILED DESCRIPTION OF THE INVENTION

Hereinafter, there are described a metal powder sintering paste and a method of producing a metal powder sintering paste as well as a conductive material and a method of producing a conductive material of the present embodiments.

The metal powder sintering paste of the present disclosure contains, as a principal, component, silver particles having an average particle diameter (a median diameter) of 0.3 μm to 5 μm and contains an anionic surfactant but is substantially free from resin.

Furthermore, the method of producing a metal powder sintering paste of the present disclosure includes mixing an anionic surfactant with silver particles having an average particle diameter (a median diameter) of 0.3 μm to 5 μm, wherein substantially no resin is mixed together.

In the metal powder sintering paste of the present disclosure, the anionic surfactant exhibits the resistance to bleed provided by its electric field with respect to an electrode such as silver or gold that generally has a negative surface potential. This improves the leakage onto the substrate bottom surface and the wire bonding defects caused by contamination, which makes it possible to produce reliable semiconductor devices, etc.

[Silver Particles]

In the metal particles to be used for the metal powder sintering paste, silver particles are the principal component. This means that the content of the silver particles contained in the metal particles is, for example, at least 70% by mass, preferably at least 80% by mass, and more preferably at least 90% by mass. The silver particles to be used herein may be one type of silver particles having the same average particle diameter (median diameter) or a mixture of at least two types of silver particles that are different in average particle diameter. The silver particles have an average particle diameter (a median diameter) of 0.3 μm to 5 μm, preferably 1.0 μm to 4 μm, and more preferably 1.5 μm to 3.5 μm. This can lower the electrical resistance value. Metal particles to be used other than the silver particles can be those having an average particle diameter (a median diameter) of 0.1 μm to 15 μm, but the average particle diameter thereof is preferably 0.3 μm to 10 μm, more preferably 0.3 μm to 5 μm.

With respect to the silver particles, the content of the particles having a particle diameter of less than 0.3 μm is preferably not more than 5% by mass, more preferably not more than 4% by mass.

With respect to the silver particles, the content of the particles having a particle diameter of not more than 0.5 μm is preferably not more than 15% by mass, more preferably not more than 10% by mass.

The average particle diameter (the median diameter) of the silver particles can be measured by a laser diffraction method. The average particle diameter (the median diameter) denotes the value where the accumulated frequency by volume is 50%, which is obtained from a particle size distribution. Hereinafter, the average particle diameter denotes the median diameter unless otherwise noted.

Furthermore, the silver particles have a specific surface area of 0.4 $m^2/g$ to 1.5 $m^2/g$, preferably 0.6 $m^2/g$ to 0.9 $m^2/g$, and more preferably 0.66 $m^2/g$ to 0.74 $m^2/g$. This can increase the area where adjacent silver particles are joined to each other, and since the addition of the silver particles results in a small increase in viscosity, the paste can contain many silver particles. This prevents the occurrence of voids and allows a high joining strength to be obtained. The specific surface area of the metal particles that are the main raw materials of the metal powder sintering paste can be measured by the BET method.

The shape of each silver particle is not limited. However, examples thereof include a spherical shape, a flat shape, a flake shape, and a polyhedral shape, but the flake shape is preferred. This is because the flake shape increases the area of each silver particle where it is in contact with adjacent silver particles and decreases the electric resistance. The shapes of the metal particles each having an average particle diameter within a predetermined range are preferably uniform. When two or more types of metal particles that are different in average particle diameter are mixed, the shapes of the metal particles with the respective average particle diameters may be the same or different from each other. For example, when two types of metal particles, namely, those with an average particle diameter of 3 μm and those with an average particle diameter of 0.3 μm are mixed together, the metal particles with an average particle diameter of 0.3 μm may have a spherical shape while the metal particles with an average particle diameter of 3 μm may have a flat shape.

The metal powder sintering paste contains silver particles as its principal component. In the metal powder sintering paste, one type or more of metal particles other than silver particles can be used and examples thereof include gold, copper, platinum, palladium, rhodium, ruthenium, iridium, and osmium.

The content of the silver particles is preferably at least 70% by mass, more preferably at least 85% by mass, and further preferably at least 90% by mass, with respect to the paste. This is because when the content of the silver particles is within the predetermined ranges, the joining strength of the resultant conductive material increases.

[Surfactant]

The metal powder sintering paste contains an anionic surfactant. Due to the electric field generated by the anionic nature, the anionic surfactant exhibits the resistance to bleed provided by its electric field with respect to an electrode such as silver or gold that generally has a negative surface potential. This improves the leakage onto the substrate bottom surface and the wire bonding defects caused by contamination, which makes it possible to produce reliable semiconductor devices.

The surfactant has preferably a high volatility. Specifically, when the temperature is raised from around room temperature at 2° C./imin in thermogravimetric-differential thermal analysis (TG-DTA), those in which the residue obtained at 350° C. is not more than 20% by mass with respect to the initial mass are preferable, and those in which the residue obtained at 350° C. is not more than 5% by mass are more preferable. This is because when the residue is not more than 20% by mass, volatile residues do not disturb sintering during calcining, which increases the joining strength.

The anionic surfactant is preferably a carboxylic acid type containing a carboxyl group or a salt thereof, more preferably a carboxylic acid type represented by Formula (I) below.

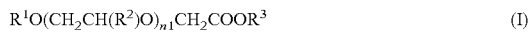

$$R^1O(CH_2CH(R^2)O)_{n1}CH_2COOR^3 \quad (I)$$

[In the formula, $R^1$ is a linear or branched alkyl group having at least 7 carbon atoms, $R^2$ is any one of —H, —CH$_3$, —CH$_2$CH$_3$, and —CH$_2$CH$_2$CH$_3$, $R^3$ is —H or alkali metal, and n1 is in the range of 2 to 5.]

Furthermore, the anionic surfactant is more preferably a carboxylic acid type represented by Formula (II) below.

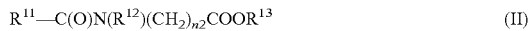

$$R^{11}—C(O)N(R^{12})(CH_2)_{n2}COOR^{13} \quad (II)$$

[In the formula, $R^{11}$ is a linear or branched alkyl group having at least 7 carbon atoms, $R^{12}$ is any one of —H, —CH$_3$, —CH$_2$CH$_3$, and —CH$_2$CH$_2$CH$_3$, $R^{13}$ is —H, NH$^+$(C$_2$H$_4$OH)$_3$, or alkali metal, and n2 is in the range of 1 to 5.]

Moreover, the anionic surfactant is further preferably a carboxylic acid type represented by Formula (III) below.

$$R^{21}—CH=CH—(C_2)_{n3}COOR^{22} \quad (III)$$

[In the formula, $R^{21}$ is a linear or branched alkyl group having at least 7 carbon atoms, $R^{22}$ is —H or alkali metal, and n3 is in the range of 1 to 10.]

Furthermore, the anionic surfactant is further preferably a carboxylic acid type represented by Formula (IV) below.

$$R^{31}—COOR^{32} \quad (IV)$$

[In the formula, $R^{31}$ is a linear or branched alkyl group or alkoxy group having at least 7 carbon atoms, which has been optionally substituted with OH or COOR$^{33}$ ($R^{33}$ is alkali metal), and $R^{32}$ is —H or alkali metal.]

Moreover, the anionic surfactant is preferably a sulfonic acid type containing a sulfo group or a salt thereof, more preferably a sulfonic acid type represented by Formula (V) below.

$$R^{41}—SO_3R^{42} \quad (V)$$

[In the formula, $R^{41}$ is a linear or branched alkyl group, aralkyl group or alkenyl group having at least 7 carbon atoms, which has been optionally substituted with OH or COOR$^{43}$ ($R^{43}$ is an alkyl group), or an aralkyl group, and $R^{42}$ is —H or alkali metal.]

Furthermore, the anionic surfactant is preferably a carboxylic-sulfonic acid type containing a carboxyl group, or a salt thereof and a sulfo group, or both salts thereof, more preferably a carboxylic-sulfonic acid type represented by Formula (VI) below.

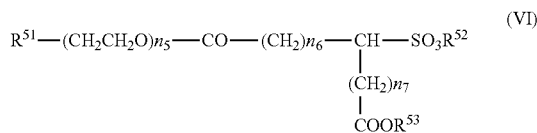

$$R^{51}—(CH_2CH_2O)n_5—CO—(CH_2)n_6—\underset{\underset{COOR^{53}}{|}}{\underset{(CH_2)n_7}{|}}CH—SO_3R^{52} \quad (VI)$$

[In the formula, $R^{51}$ is a linear or branched alkoxy group having at least 7 carbon atoms or $R^{54}$—CONH— ($R^{54}$ is a linear or branched alkyl group having at least 7 carbon atoms), $R^{52}$ and $R^{53}$ are —H or alkali metal, n5 is in the range of 1 to 8, n6 is in the range of 0 to 1, and n7 is in the range of 0 to 1.]

Moreover, the anionic surfactant is preferably of a phosphate ester structure, or a salt thereof, namely, a phosphate ester type, more preferably a sulfate ester type represented by Formula (VII) below.

$$R^{61}—O—PO(OR^{62})OR^{63} \quad (VII)$$

[In the formula, $R^{61}$ and $R^{62}$ each are a linear or branched alkyl group, and $R^{63}$ is —H or alkali metal.]

The content of the surfactant is preferably up to 10% by mass with respect to the paste. Furthermore, the content of the surfactant is preferably not more than 2% by mass with respect to the paste, because this allows the surfactant to be completely volatilized by calcining.

The surfactant has preferably a contact angle of at least 10 degrees with respect to a gold electrode with a surface roughness Ra of 0.04 μm because this prevents the dispersion medium contained optionally from bleeding. The contact angle of the surfactant contained in the metal powder sintering paste can be measured with a contact angle meter.

The surfactant is preferably in a liquid state at 25° C., because this reduces the solid content in the paste to allow a larger amount of silver powder to be contained, which tends to prevent voids from occurring.

[Organic Solvent]

The metal powder sintering paste contains preferably an organic solvent as a dispersion medium. This is because uniform dispersion of the silver particles in an organic solvent allows a high quality coating to be carried out efficiently by a method such as printing or dispensing.

There are some metal powder sintering pastes that contain resins. However, from the perspectives that sintering requires high temperature and a resin component or the volatile portion thereof contaminates peripheral members, the better ones are those that are free from resin and contain a volatile organic solvent as a dispersion medium. However, since the volatile organic solvent that is often used for metal powder sintering pastes has a lower viscosity than that of an adhesive containing resin, fine irregularities of the substrate-side electrode surface to be joined often cause an organic solvent component to wet/spread. In this case, bleeding occurs in an unexpected portion in the substrate, which causes the organic solvent to leak onto the substrate bottom surface during the process or results in wire bonding defects due to contamination. On the other hand, in the metal powder sintering paste of the present embodiment, since it contains an anionic surfactant, even when it contains an organic solvent, the organic solvent can be prevented from bleeding.

The dispersion medium may be one type of organic solvent or a mixture of two or more types of organic solvents but is preferably a mixture of diol and ether. This is because a metal powder sintering paste containing such a dispersion medium used therein can join an element and a mounting member together at a lower temperature.

The boiling point of the dispersion medium is preferably not more than 300° C., more preferably 150° C. to 250° C. This is because when the boiling point of the dispersion medium is in the range of 150° C. to 250° C., the change in viscosity of the metal powder sintering paste at room temperature, which is caused by volatilization of the dispersion medium, can be prevented and thus a good workability is obtained. Furthermore, when the dispersion medium has a boiling point in that range, the dispersion medium can be completely volatilized by calcining.

Examples of diol include: aliphatic diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol(2,2-dimethyl-propane-1,3-diol), 1,2-hexanediol, 2,5-hexanediol, 2-methyl-2,4-pentanediol, 3-methyl-1,3-pentanediol, and 2-ethyl-1,3-hexanediol; alkylene oxide adducts of 2,2-bis(4-hydroxy cyclohexyl)propane and 2,2,-bis(4-hydroxy cyclohexyl)propane; and alicyclic diols such as 1,4-cyclohexanediol and 1,4-cyclohexanedimethanol.

Examples of ether include dipropylene glycol methyl ether, tripropylene glycol methyl ether, propylene glycol n-propyl ether, dipropylene glycol n-propyl ether, propylene glycol n-butyl ether, dipropylene glycol n-butyl ether, propylene glycol phenyl ether, dipropylene glycol dimethyl ether, 1,3-dioxolane, ethylene glycol monobutyl ether, diethylene glycol monoethyl ether, diethylene glycol monobutyl ether, and ethylene glycol monoethyl ether.

When the dispersion medium is a mixture of diol and ether, the mass ratio of diol to ether is preferably diol:ether=7 to 9:2. This is because the metal powder sintering paste containing a mixture of such organic solvents used therein can join an element and a mounting member together at a lower temperature.

The content of the dispersion medium is not particularly limited since the required viscosity varies according to the method of applying the metal powder sintering paste. In order to control the porosity of the sintered joining layer that is obtained by calcining the metal powder sintering paste, the content of the dispersion medium is preferably up to 30% by mass with respect to the metal powder sintering paste.

[Resin]

The metal powder sintering paste is substantially free from resin. Examples of the resin include binders such as an epoxy resin and a phenolic resin as well as hardeners such as a polyamide resin.

<Method of Producing Metal Powder Sintering Paste>

The method of producing a metal powder sintering paste includes mixing an anionic surfactant with silver particles having an average particle diameter (a median diameter) of 0.3 μm to 5 μm, wherein substantially no resin is mixed together.

When the metal powder sintering paste further contains a dispersion medium, the method of producing a metal powder sintering paste includes mixing an anionic surfactant, silver particles having an average particle diameter of 0.3 μm to 5 μm, and a dispersion medium, wherein substantially no resin is mixed together.

In the method of producing a metal powder sintering paste, mixing can be carried out at room temperature and preferably a degassing process is included. Inclusion of the degassing process can prevent the joining strength from being reduced due to gas bubbles entering under the chip.

<Metal Powder Sintering Paste>

A preferred metal powder sintering paste is one with which a conductive material having an electric resistance of not more than 6 μΩ·cm can be obtained by calcining in an air oven at 170° C. for 60 minutes.

A preferred metal powder sintering paste is one with which the ratio of the wetting/spreading diameter of the dispersion medium to the original diameter of the paste is not higher than 1.4, when it is applied to a gold electrode with a surface roughness Ra of 0.04 μm, which then is left to stand for 20 minutes. This is because such a metal powder sintering paste improves the leakage onto the substrate bottom surface and the wire bonding defects caused by contamination and thereby makes it possible to produce reliable semiconductor devices.

The metal powder sintering paste is preferably one which is characterized in that the ratio of the wetting/spreading diameter of the dispersion medium to the original diameter of the paste is not higher than 3.0, when it is applied to a gold electrode with a surface roughness Ra of 0.48 μm, which then is left to stand for 20 minutes. This is because such a metal powder sintering paste improves the leakage onto the substrate bottom surface and the wire bonding defects caused by contamination and thereby makes it possible to produce reliable semiconductor devices.

<Method of Producing Conductive Material>

Furthermore, the present disclosure relates to a method of producing a conductive material, the method including a process of calcining a metal powder sintering paste of the present disclosure.

[Calcining Conditions]

The above-mentioned calcining may be carried out, for example, in an atmosphere such as a non-oxidizing atmosphere, an air atmosphere, a vacuum atmosphere, an oxygen atmosphere, a mixed gas atmosphere, or an airflow but preferably is carried out in an oxygen, ozone, or air atmosphere. This is because calcining in such an atmosphere accelerates the thermal diffusion of silver and thereby makes it possible to obtain a conductive material having a higher sintering strength.

In the present disclosure, the above-mentioned calcining is carried out preferably at a temperature in the range of 150° C. to 320° C. This is because when calcining is carried out in this temperature range, metal can be joined at a lower temperature than the melting point of the resin package on which a semiconductor element or the like is mounted. Furthermore, calcining is carried out more preferably at a temperature in the range of 160° C. to 260° C., further preferably at a temperature in the range of 170° C. to 195° C. This is because a lead frame, for which a conventional resin-containing adhesive is supposed to be used, contains a member that deteriorates at a temperature of 200° C. or higher.

Preferably, the above-mentioned calcining is carried out so that the ratio of the wetting/spreading diameter of the dispersion medium to the original diameter of the paste is not higher than 1.4, when the metal powder sintering paste is applied to a gold electrode with a surface roughness Ra of 0.04 μm, which then is left to stand for 20 minutes. Such a physical property can be obtained by adding the anionic surfactant described above.

Preferably, calcining is carried out so that the ratio of the wetting/spreading diameter of the dispersion medium to the original diameter of the paste is not higher than 3.0, when the metal powder sintering paste is applied to a gold electrode with a surface roughness Ra of 0.48 μm, which then is left to stand for 20 minutes. Such a physical property can be obtained by adding the anionic surfactant described above.

<Conductive Material>

The conductive material of the present disclosure can be obtained by calcining a metal powder sintering paste of the present disclosure. The porosity of the conductive material is preferably 5% by volume to 35% by volume, more preferably 5% by volume to 25% by volume, and further preferably 5% by volume to 20% by volume. The conductive material has the advantage of having a high joining strength.

Preferably, the conductive material of the present disclosure has an electrical resistance value of not higher than 50 μΩ·cm. This is because the lower the electric resistance thereof, the better the heat dissipation, and the less the power loss when it is used as an electrode. The electrical resistance value is more preferably not higher than 10 μΩ·cm and further preferably not higher than 6 μΩ·cm.

EXAMPLES

Hereinafter, with reference to examples, comparative examples, and reference examples, the metal powder sintering paste, the method of producing a metal powder sintering paste, the conductive material, and the method of producing a conductive material according to the present embodiments are described.

Example 1

Organic solvents, namely, 2-ethyl-1,3-hexanediol (0.58 g) and diethylene glycol monobutyl ether (0.14 g), and an anionic liquid surfactant (manufactured by Sanyo Chemical Industries, Ltd., BEAULIGHT LCA-H (product name), laureth-5 carboxylic acid, liquid at 25° C., 0.09 g) were stirred with a planetary centrifugal mixer (THINKY MIXER (AWATORIRENTARO) AR-250 (product name), manufactured by THINKY) for one cycle including one minute of stirring and 15 seconds of degassing. Thus, a solvent mixture was obtained.

Flaky silver particles (manufactured by Fukuda Metal Foil & POWDER Co., LTD., AgC-239 (product name), flake form, average particle diameter (median diameter): 2.7 μm, specific surface area: 0.7 m$^2$/g, the content of the particles with a particle diameter of smaller than 0.3 μm: 1% by mass, and the content of the particles with a particle diameter of not larger than 0.5 μm: 3% by mass, 9.19 g) were weighed and then added to the solvent mixture described above. The mixture thus obtained was stirred with the planetary centrifugal mixer (THINKY MIXER (AWATORIRENTARO) AR-250 (product name), manufactured by THINKY) for one cycle including one minute of stirring and 15 seconds of degassing. Thus, a metal powder sintering paste was obtained (the content of the silver particles was 91.9% by mass).

Example 2

A metal powder sintering paste (the content of the silver particles was 91.9% by mass) was obtained in the same manner as in Example 1 except that an anionic liquid surfactant (manufactured by Sanyo Chemical Industries, Ltd., BEAULIGHT LCA-25NH (product name), laureth-4 carboxylic acid, liquid at 25° C., 0.09 g) was used as the liquid surfactant.

Example 3

A metal powder sintering paste (the content of the silver particles was 91.9% by mass) was obtained in the same manner as in Example 1 except that an anionic liquid surfactant (manufactured by Kao Corporation, Kaosera 8110 (product name), liquid at 25° C., 0.09 g) was used as the liquid surfactant.

Example 4

A metal powder sintering paste (the content of the silver particles was 91.9% by mass) was obtained in the same manner as in Example 1 except that an anionic liquid surfactant (manufactured by Sanyo Chemical Industries, Ltd., BEAULIGHT LCA-30D (product name), sodium laureth-4 carboxylate, liquid at 25° C., 0.09 g) was used as the liquid surfactant.

Example 5

A metal powder sintering paste (the content of the silver particles was 91.9% by mass) was obtained in the same manner as in Example 1 except that an anionic liquid surfactant (manufactured by Sanyo Chemical Industries, Ltd., BEAULIGHT LCA-25N (product name), sodium laureth-4 carboxylate, liquid at 25° C., 0.09 g) was used as the liquid surfactant.

Example 6

A metal powder sintering paste (the content of the silver particles was 91.9% by mass) was obtained in the same manner as in Example 1 except that an anionic liquid surfactant (manufactured by Sanyo Chemical Industries, Ltd., BEAULIGHT ECA (product name), sodium trideceth-4 carboxylate, liquid at 25° C., 0.09 g) was used as the liquid surfactant.

Example 7

A metal powder sintering paste (the content of the silver particles was 91.9% by mass) was obtained in the same manner as in Example 1 except that an anionic liquid surfactant (manufactured by NOF CORPORATION, OLEOYLSARCOSINE 221P (product name), N-oleoyl-N-methylglycine (oleoyl sarcosine), liquid at 25° C., 0.09 g) was used as the liquid surfactant.

Example 8

A metal powder sintering paste (the content of the silver particles was 91.9% by mass) was obtained in the same manner as in Example 1 except that an anionic liquid surfactant (manufactured by NOF CORPORATION, NONSOUL OK-1 (product name), potassium oleate (aqueous solution), liquid at 25° C., 0.09 g) was used as the liquid surfactant.

Example 9

A metal powder sintering paste (the content of the silver particles was 91.9% by mass) was obtained in the same manner as in Example 1 except that an anionic liquid surfactant (manufactured by NOF CORPORATION, SOFT-ILT® AS-L (product name), N-dodecanoyl-N-methyl-β-alanine sodium salt, liquid at 25° C., 0.09 g) was used as the liquid surfactant.

Example 10

A metal powder sintering paste (the content of the silver particles was 91.9% by mass) was obtained in the same manner as in Example 1 except that an anionic liquid surfactant (manufactured by NOF CORPORATION, SOFT-ILT® AT-L (product name), N-dodecanoyl-N-methyl-β-alanine triethanolamine salt, liquid at 25° C., 0.09 g) was used as the liquid surfactant.

Example 11

A metal powder sintering paste (the content of the silver particles was 91.9% by mass) was obtained in the same manner as in Example 1 except that an anionic liquid surfactant (manufactured by NOF CORPORATION, FIRET® L (product name), N-lauroyl-N-methylglycine-sodium salt, liquid at 25° C., 0.09 g) was used as the liquid surfactant.

Example 12

A metal powder sintering paste (the content of the silver particles was 91.9% by mass) was obtained in the same manner as in Example 1 except that an anionic liquid surfactant (manufactured by NOF CORPORATION, NONSOUL OK-2 (product name), potassium oleate (aqueous solution), liquid at 25° C., 0.09 g) was used as the liquid surfactant.

Example 13

A metal powder sintering paste (the content of the silver particles was 91.9% by mass) was obtained in the same manner as in Example 1 except that an anionic liquid surfactant (manufactured by NOF CORPORATION, NONSOUL LK-30 (product name), potassium cocoate (aqueous solution), liquid at 25° C., 0.09 g) was used as the liquid surfactant.

Example 14

A metal powder sintering paste (the content of the silver particles was 91.9% by mass) was obtained in the same manner as in Example 1 except that an anionic liquid surfactant (manufactured by Sanyo Chemical Industries, Ltd., BEAULIGHT SHAA (product name), sodium lauryl glycol carboxylate, liquid at 25° C., 0.09 g) was used as the liquid surfactant.

Example 15

A metal powder sintering paste (the content of the silver particles was 91.9% by mass) was obtained in the same manner as in Example 1 except that an anionic liquid surfactant (manufactured by Kao Corporation, LATEMUL ASK (product name), dipotassium alkenyl succinate, liquid at 25° C., 0.09 g) was used as the liquid surfactant.

Example 16

A metal powder sintering paste (the content of the silver particles was 91.9% by mass) was obtained in the same manner as in Example 1 except that an anionic liquid surfactant (manufactured by DKS Co. Ltd., NEO-HIITENOL S-70 (product name), disodium polyoxyethylene alkyl sulfosuccinate, liquid at 25° C., 0.09 g) was used as the liquid surfactant.

Example 17

A metal powder sintering paste (the content of the silver particles was 91.9% by mass) was obtained in the same manner as in Example 1 except that an anionic liquid surfactant (manufactured by Sanyo Chemical Industries, Ltd., BEAULIGHT ESS (product name), disodium C12-14 pareth-2 sulfosuccinate, liquid at 25° C., 0.09 g) was used as the liquid surfactant.

Example 18

A metal powder sintering paste (the content of the silver particles was 91.9% by mass) was obtained in the same manner as in Example 1 except that an anionic liquid surfactant (manufactured by Sanyo Chemical Industries, Ltd., BEAULIGHT A-5000 (product name), disodium lauramido peg-5 sulfosuccinate, liquid at 25° C., 0.09 g) was used as the liquid surfactant.

Example 19

A metal powder sintering paste (the content of the silver particles was 91.9% by mass) was obtained in the same manner as in Example 1 except that an anionic liquid surfactant (manufactured by NOF CORPORATION, PERSOFT® SK (product name), alkyl sulfate ester sodium salt, liquid at 25° C., 0.09 g) was used as the liquid surfactant.

Example 20

A metal powder sintering paste (the content of the silver particles was 91.9% by mass) was obtained in the same manner as in Example 1 except that an anionic liquid surfactant (manufactured by NOF CORPORATION, NEWREX® R-25L (product name), linear alkylbenzenesulfonic acid sodium salt, liquid at 25° C., 0.09 g) was used as the liquid surfactant.

Example 21

A metal powder sintering paste (the content of the silver particles was 91.9% by mass) was obtained in the same manner as in Example 1 except that an anionic liquid surfactant (manufactured by NOF CORPORATION, SUNBASE (product name), α-sulfofatty acid methyl-ester sodium salt, liquid at 25° C., 0.09 g) was used as the liquid surfactant.

Example 22

A metal powder sintering paste (the content of the silver particles was 91.9% by mass) was obtained in the same manner as in Example 1 except that an anionic liquid surfactant (manufactured by NOF CORPORATION, NISSAN TRAX® K-40 (product name), polyoxyethylene lauryl ether sulfate-sodium salt, liquid at 25° C., 0.09 g) was used as the liquid surfactant.

Example 23

A metal powder sintering paste (the content of the silver particles was 91.9% by mass) was obtained in the same manner as in Example 1 except that an anionic liquid surfactant (manufactured by DKS Co. Ltd., NEOGEN AO-90 (product name), sodium α-olefin sulfonate, powder at 25° C., 0.09 g) was used as the liquid surfactant.

Example 24

A metal powder sintering paste (the content of the silver particles was 91.9% by mass) was obtained in the same manner as in Example 1 except that an anionic liquid surfactant (manufactured by Kao Corporation, LATEMUL PS (product name), sodium alkane sulfonate, liquid at 25° C., 0.09 g) was used as the liquid surfactant.

Example 25

A metal powder sintering paste (the content of the silver particles was 91.9% by mass) was obtained in the same manner as in Example 1 except that an anionic liquid surfactant (manufactured by DKS Co. Ltd., PLYSURF DBS (product name), sodium alkyl phosphate, liquid at 25° C., 0.09 g) was used as the liquid surfactant.

Comparative Example 1

A metal powder sintering paste (the content of the silver particles was 91.9% by mass) was obtained in the same manner as in Example 1 except that a cationic liquid surfactant (manufactured by Sanyo Chemical Industries, Ltd., LEBON TM-16 (product name), cetrimonium chloride, liquid at 25° C., 0.09 g) was used as the liquid surfactant.

Comparative Example 2

A metal powder sintering paste (the content of the silver particles was 91.9% by mass) was obtained in the same manner as in Example 1 except that a nonionic liquid surfactant (manufactured by Sanyo Chemical Industries, Ltd., EMULMIN NL-70 (product name), laureth-7, liquid at 25° C., 0.09 g) was used as the liquid surfactant.

Comparative Example 3

A metal powder sintering paste (the content of the silver particles was 91.9% by mass) was obtained in the same manner as in Example 1 except that a nonionic liquid surfactant (manufactured by Kao Corporation, Kaosera 8200 (product name), liquid at 25° C., 0.09 g) was used as the liquid surfactant.

Comparative Example 4

Organic solvents, namely, 2-ethyl-1,3-hexanediol (0.65 g) and diethylene glycol monobutyl ether (0.16 g) were mixed together and then stirred with the planetary centrifugal mixer (THINKY MIXER (AWATORIRENTARO) AR-250 (product name), manufactured by THINKY) for one cycle including one minute of stirring and 15 seconds of degassing. Thus, a solvent mixture was obtained.

Flaky silver particles (manufactured by Fukuda Metal Foil & POWDER Co., LTD., AgC-239 (product name), 9.19 g) were weighed and then added to the solvent mixture. The mixture thus obtained was stirred with the planetary centrifugal mixer (THINKY MIXER (AWATORIRENTARO) AR-250 (product name), manufactured by THINKY) for one cycle including one minute of stirring and 15 seconds of degassing. Thus, a metal powder sintering paste was obtained (the content of the silver particles was 91.9% by mass).

Tables 1 and 2 indicate the results of the measurements of the bleed ratio, electric resistance, and joining strength of Examples (Exs.) 1 to 25 and Comparative Examples (Comp. Exs.) 1 to 4. Since those with an electric resistance of 10 μΩ·cm or higher, which was obtained as the result of the measurement of the electric resistance, cannot be expected to have a high joining property, they were partly excluded from the evaluation of the joining strength. Furthermore, Table 3 indicates the results of the measurements of the electric resistance that was measured with various calcining temperatures with respect to Example 1 that showed a good result in Table 1 and Comparative Example 4 that contained no surfactant added thereto. The measurements of the bleed ratio, electric resistance, and joining strength were carried out as follows.

Each metal powder sintering paste obtained as described above was applied onto a substrate having a gold electrode with a surface roughness Ra of 0.04 μm on its surface by a stamping method to have a diameter of 170±50 μm, which then was left to stand for 20 minutes. Thereafter, the diameter including the dispersion medium that had bled was measured, and then the bleed ratio was calculated as the ratio of the diameter after bleeding to the original diameter of the paste.

Each metal powder sintering paste obtained as described above was applied to a glass substrate (thickness: 1 mm) by the screen printing method to have a thickness of 100 μm. Each glass substrate with a conductive material composition applied thereto was heated in an air atmosphere for 60 minutes at 170° C. in the case of Tables 1 and 2 and at specified temperatures indicated in Table 3. The electric resistance of each wiring (a conductive material) thus obtained was measured with MCP-T600 (product name) (manufactured by Mitsubishi Chemical Corporation) by a four-terminal method.

Each metal powder sintering paste obtained as described above was applied onto a substrate having a silver electrode on its surface by the stamping method, and a semiconductor element that has a silver electrode on its reverse side and a sapphire substrate with an outer dimension of 500×300 μm and a thickness of 150 μm was mounted thereon. The substrate having the semiconductor element mounted thereon with the metal powder sintering paste interposed therebetween was heated with an air oven at 170° C. for 60 minutes and thereafter, it was cooled. Then, shear force was applied in the direction of removing the semiconductor element from the substrate and the strength at which the semiconductor element was detached was measured as the joining strength.

Moreover, surfactants used in Examples 1 to 15 and Comparative Examples 1 to 3 were subjected to volatility evaluation by TG-DTA, and the residue (% by mass) at 350° C. was additionally recorded in Tables 1 and 2. The TG-DTA was carried out using TG/DTA6300 manufactured by SII NanoTechnology Inc. and an aluminum open sample pan under the conditions including a sample mass of 5 mg, an air flow rate of 200 mL/min, an initial temperature of 30° C., and a temperature rising rate of 2° C./min, and then the mass of the residue obtained when the temperature reached 350° C. was calculated as a ratio thereof to the initial mass.

TABLE 1

| | Surfactant Properties | | | Paste Properties | | | |
|---|---|---|---|---|---|---|---|
| | Polarity | Type | Principal Component Rational Formula | Residue at 350° C. (wt %) | Bleed Ratio | Electric Resistance (μΩ · cm) | Die Shear Strength (MPa) |
| Ex. 1 | Anionic | Carboxylic acid type | $C_{12}H_{25}O(CH_2CH_2O)_nCH_2COOH$ (n = 4) | 2.2 | 1.55 | 4.28 | 44 |
| Ex. 2 | Anionic | Carboxylic acid type | $C_{12}H_{25}O(CH_2CH_2O)_nCH_2COOH$ (n = 2.5) | 2.2 | 1.27 | 4.08 | 48 |
| Ex. 3 | Anionic | Carboxylic acid type | $C_{12}H_{25}O(CH_2CH_2O)_nCH_2COOH$ (n = 4.5) | 3.3 | 1.49 | 4.53 | 47 |
| Ex. 4 | Anionic | Carboxylic acid type | $C_{12}H_{25}O(CH_2CH_2O)_nCH_2COONa$ (n≠3) | 5.5 | 1.45 | 5.43 | 22 |
| Ex. 5 | Anionic | Carboxylic acid type | $C_{12}H_{25}O(CH_2CH_2O)_nCH_2COONa$ (n≠3) | 5.2 | 1.41 | 5.40 | 17 |
| Ex. 6 | Anionic | Carboxylic acid type | $C_{13}H_{27}O(CH_2CH_2O)_nCH_2COONa$ (n≠3) | 21.6 | 1.43 | 7.07 | 9 |
| Ex. 7 | Anionic | Carboxylic acid type | $C_{17}H_{33}C(O)N(CH_3)CH_2COOH$ | 17.2 | 1.44 | 5.49 | 26 |
| Ex. 8 | Anionic | Carboxylic acid type | $C_8H_{17}CH\!\!=\!\!CHC_7H_{14}COOK$ | 7.5 | 1.48 | 5.66 | 31 |

TABLE 1-continued

| | Surfactant Properties | | | Paste Properties | | |
|---|---|---|---|---|---|---|
| | Polarity | Type | Principal Component Rational Formula | Residue at 350° C. (wt %) | Bleed Ratio | Electric Resistance ($\mu\Omega \cdot cm$) | Die Shear Strength (MPa) |
| Ex. 9 | Anionic | Carboxylic acid type | [R—C(O)N(CH$_3$)C$_2$H$_4$COO]$^-$Na$^+$ | 8.2 | 1.43 | 5.65 | 22 |
| Ex. 10 | Anionic | Carboxylic acid type | [R—C(O)N(CH$_3$)C$_2$H$_4$COO]$^-$NH$^+$(C$_2$H$_4$OH)$_3$ | 5.3 | 1.38 | 4.23 | 35 |
| Ex. 11 | Anionic | Carboxylic acid type | [C$_{11}$H$_{23}$—C(O)N(CH$_3$)CH$_2$COO]$^-$Na$^+$ | 8.9 | 1.37 | 5.42 | 22 |
| Ex. 12 | Anionic | Carboxylic acid type | CH$_3$(CH$_2$)$_7$CH=CH(CH$_2$)$_7$COOK | 12.7 | 1.47 | 6.41 | 15 |
| Ex. 13 | Anionic | Carboxylic acid type | R—COOK | 16.7 | 1.43 | 6.74 | 17 |
| Ex. 14 | Anionic | Carboxylic acid type | C$_{10}$H$_{21}$CH(OH)CH$_2$OCH$_2$COONa | 12.0 | 1.46 | 5.82 | 14 |
| Ex. 15 | Anionic | Carboxylic acid type | R—CH(COOK)CH$_2$COOK | 28.0 | 1.48 | 5.84 | 10 |

TABLE 2

| | Surfactant Properties | | | Paste Properties | | |
|---|---|---|---|---|---|---|
| | Polarity | Type | Principal Component Rational Formula | Residue at 350° C. (wt %) | Bleed Ratio | Electric Resistance ($\mu\Omega \cdot cm$) | Die Shear Strength (MPa) |
| Ex. 16 | Anionic | Carboxylic-sulfonic acid type | RO(CH$_2$CH$_2$O)$_n$COCH$_2$CH(SO$_3$Na)—COONa (n≠7) | — | 1.42 | 4.72 | 18 |
| Ex. 17 | Anionic | Carboxylic-sulfonic acid type | RO(CH$_2$CH$_2$O)$_n$COCH(SO$_3$Na)—CH$_2$COONa (n≠2) | — | 1.45 | 15.87 | — |
| Ex. 18 | Anionic | Carboxylic-sulfonic acid type | C$_{11}$H$_{23}$CONHCH$_2$CH$_2$O(CH$_2$CH$_2$O)$_n$COCH(SO$_3$Na)—CH—COONa (n≠5) | — | 1.47 | 5.19 | 13 |
| Ex. 19 | Anionic | Sulfonic acid type | ROSO$_3$Na | — | 1.52 | 4.63 | 13 |
| Ex. 20 | Anionic | Sulfonic acid type | C$_n$H$_{2n+1}$(C$_6$H$_4$)SO$_3$Na(n = 10-16) | — | 1.49 | 6.05 | 15 |
| Ex. 21 | Anionic | Sulfonic acid type | R—CH(—SO$_3$Na)—COOCH$_3$ | — | 1.49 | 42.12 | — |
| Ex. 22 | Anionic | Sulfonic acid type | C$_{12}$H$_{25}$O(CH$_2$CH$_2$O)$_n$SO$_3$Na | — | 1.53 | 26.75 | 1 |
| Ex. 23 | Anionic | Sulfonic acid type | R—CH=CH—CH$_2$—SO$_3$Na | — | 1.49 | 35.26 | — |
| Ex. 24 | Anionic | Sulfonic acid type | R—SO$_3$Na | — | 1.36 | 15.03 | — |
| Ex. 25 | Anionic | Phosphorus acid type | ROPO(—OR)ONa | — | 1.38 | 7.37 | 9 |
| Comp. Ex. 1 | Cationic | — | [C$_{16}$H$_{33}$—N(CH$_3$)$_3$]$^+$Cl$^-$ | 1.4 | 1.70 | 56.54 | 5 |
| Comp. Ex. 2 | Nonionic | — | C$_{12}$H$_{25}$O(CH$_2$CH$_2$O)$_n$H (n≠7) | 0.3 | 2.29 | 5.36 | 32 |
| Comp. Ex. 3 | Nonionic | — | Unsaturated carboxylic acid ester | 43.0 | 2.20 | 45.57 | 10 |
| Comp. Ex. 4 | None | — | — | — | 1.72 | 4.53 | 14 |

TABLE 3

| | | Calcining Temperature | | | | |
|---|---|---|---|---|---|---|
| | | 172° C. | 177° C. | 182° C. | 185° C. | 192° C. |
| Comp. Ex. 4 | No surfactant | 5.2 $\mu\Omega \cdot cm$ | 5.0 $\mu\Omega \cdot cm$ | 4.5 $\mu\Omega \cdot cm$ | 4.2 $\mu\Omega \cdot cm$ | 3.9 $\mu\Omega \cdot cm$ |
| Ex. 1 | BEAULIGHT LCA-H | 4.5 $\mu\Omega \cdot cm$ | 4.3 $\mu\Omega \cdot cm$ | 3.8 $\mu\Omega \cdot cm$ | 3.8 $\mu\Omega \cdot cm$ | 3.9 $\mu\Omega \cdot cm$ |

As indicated in Tables 1 and 2, as compared to Comparative Example 4, in which no surfactant was added, in Examples 1 to 25, in each of which an anionic surfactant was added, the bleed ratio was decreased and thus an improvement was made. On the other hand, in Comparative Example 1, in which a cationic surfactant was added, no change was observed, and in Comparative Examples 2 and 3, in each of which a nonionic surfactant was added, the bleed ratio adversely increased and was worsened. Thus, it is clear that an anionic surfactant improves the bleed resistance.

On the other hand, with respect to sinterability, among Examples 1 to 15, in each of which the surfactant was an anionic carboxylic acid type, only Examples 6 and 15 that had poor volatility with the residue at 350° C. exceeding 20% by mass had reduced sinterability as compared to Comparative Example 4, in which no surfactant was added. Furthermore, high joining strength exceeding 40 MPa was obtained only in Examples 1 to 3 having good volatility with the residue at 350° C. being not more than 5% by mass.

On the other hand, in Comparative Example 1, in which a cationic surfactant was used, the residue at 350° C. was not higher than 5% by mass but the joining strength was low, specifically 5 MPa. Among those in which a nonionic surfactant was used, Comparative Example 3 with poor volatility had a low joining strength, but Comparative Example 2 with high volatility had a higher joining strength. However, as compared to Examples 1 to 3, in each of which an anionic surfactant was used, they had better volatility but the joining strength thereof did not reach 40 MPa.

The results described above indicate that the use of an anionic surfactant improves the bleed resistance, and the use of a surfactant with high volatility can maintain or improve the joining strength. Specifically, the residue at 350° C. is preferably not more than 20% by mass, most preferably not more than 5% by mass. In Example 1, in which an improvement was observed, it was confirmed that a low resistance was achieved at lower temperature as indicated in Table 3, and it is considered to be sufficient that the calcining temperature is around 180° C., which is equivalent to that of a resin adhesive material.

Example 26

Organic solvents, namely, 2-ethyl-1,3-hexanediol (0.38 g) and diethylene glycol monobutyl ether (0.09 g), and an anionic liquid surfactant (manufactured by Sanyo Chemical Industries, Ltd., BEAULIGHT LCA-H (product name), laureth-5 carboxylic acid, liquid at 25° C., 0.05 g) were stirred with the planetary centrifugal mixer (THINKY MIXER (AWATORIRENTARO) AR-250 (product name), manufactured by THINKY) for one cycle including one minute of stirring and 15 seconds of degassing. Thus, a solvent mixture was obtained.

Flaky silver particles (manufactured by Fukuda Metal Foil & POWDER Co., LTD., AgC-239 (product name), flake form, average particle diameter (median diameter): 2.5 μm, specific surface area: 0.7 m²/g, the content of the particles with a particle diameter of smaller than 0.3 μm: 1% by mass, and the content of the particles with a particle diameter of not larger than 0.5 μm: 3% by mass, 5.00 g) were weighed and then added to the solvent mixture described above. The mixture thus obtained was stirred with the planetary centrifugal mixer (THINKY MIXER (AWATORIRENTARO) AR-250 (product name), manufactured by THINKY) for one cycle including one minute of stirring and 15 seconds of degassing. After stirring, a mesh (330T mesh, wire diameter: 40 μm) was used to filtrate it. Thus, a metal powder sintering paste was obtained (the content of the silver particles was 90.6% by mass).

Example 27

A metal powder sintering paste (the content of the silver particles was 90.6% by mass) was obtained in the same manner as in Example 26 except that an anionic liquid surfactant (manufactured by Sanyo Chemical Industries, Ltd., BEAULIGHT LCA-25NH (product name), laureth-4 carboxylic acid, liquid at 25° C., 0.05 g) was used as the liquid surfactant.

Example 28

A metal powder sintering paste (the content of the silver particles was 90.6% by mass) was obtained in the same manner as in Example 26 except that an anionic liquid surfactant (manufactured by Kao Corporation, Kaosera 8110 (product name), liquid at 25° C., 0.05 g) was used as the liquid surfactant.

Comparative Example 5

A metal powder sintering paste (the content of the silver particles was 90.6% by mass) was obtained in the same manner as in Example 26 except that a nonionic liquid surfactant (manufactured by Kao Corporation, Kaosera 8200 (product name), liquid at 25° C., 0.05 g) was used as the liquid surfactant.

Comparative Example 6

Organic solvents, namely, 2-ethyl-1,3-hexanediol (3.01 g) and diethylene glycol monobutyl ether (0.75 g) were mixed together and then stirred with the planetary centrifugal mixer (THINKY MIXER (AWATORIRENTARO) AR-250 (product name), manufactured by THINKY) for one cycle including one minute of stirring and 15 seconds of degassing. Thus, a solvent mixture was obtained.

Flaky silver particles (manufactured by Fukuda Metal Foil & POWDER Co., LTD., AgC-239 (product name), 40.00 g) were weighed and then added to the solvent mixture. The mixture thus obtained was stirred with the planetary centrifugal mixer (THINKY MIXER (AWATORIRENTARO) AR-250 (product name), manufactured by THINKY) for one cycle including one minute of stirring and 15 seconds of degassing. After stirring, a mesh (330T mesh, wire diameter: 40 μm) was used to filtrate it. Thus, a metal powder sintering paste was obtained (the content of the silver particles was 91.4% by mass).

Table 4 indicates the results of the measurements of the contact angle of the raw material surfactant with respect to the gold electrode, the bleed ratio of the paste itself, and the joining strength of Examples 26 to 28 and Comparative Examples 5 and 6. The contact angle of the raw material surfactant with respect to the gold electrode, the bleed ratio, and the joining strength were measured as follows.

With respect to each surfactant itself used in Examples 26 to 28 and Comparative Example 5, the contact angle with respect to the gold electrode with a surface roughness Ra of 0.04 μm was measured using a contact angle meter CA-X150.

Each metal powder sintering paste obtained as described above was applied onto a substrate having a gold electrode on its surface by the stamping method, and a semiconductor element that has a silver electrode on its reverse side and a sapphire substrate with an outer dimension of 500×300 μm and a thickness of 150 μm was mounted thereon. The substrate having the semiconductor element mounted thereon with the metal powder sintering paste interposed therebetween was heated with an air oven at 175° C. for 90 minutes and thereafter, it was cooled. Then, shear force was applied in the direction of removing the semiconductor element from the substrate and the strength at which the semiconductor element was detached was measured as the joining strength.

Each metal powder sintering paste obtained as described above was applied onto two types of substrates, each of which has a gold electrode on its surface and is different in surface roughness, by the stamping method to have a diameter of 170±50 μm, which then was left to stand for 20 minutes. Thereafter, the diameter including the dispersion medium that had bled was measured, and then the bleed ratio was calculated as the ratio of the diameter after bleeding to the original diameter of the paste.

TABLE 4

|  |  | Ex. 26 | Ex. 27 | Ex. 28 | Comp. Ex. 5 | Comp. Ex. 6 |
|---|---|---|---|---|---|---|
| Surfactant Physical Property | Name | BEAULIGHT LCA-H | BEAULIGHT LCA-25NH | Kaosera 8110 | Kaosera 8200 | No Surfactant |
|  | Polarity | Anion | Anion | Anion | Nonion | — |
|  | Contact Angle (degree) with respect to Gold Electrode with Ra 0.04 μm | 13.3-14.7 | 10.6-13.5 | 10.2-13.3 | 6.6-8.4 | — |
|  | Joining Strength (MPa) | 36 | 27 | 21 | 9 | 38 |
| Bleed Ratio | Gold Electrode with Ra 0.04 μm | 1.4 | 1.2 | 1.4 | 2.2 | 1.5 |
|  | Gold Electrode with Ra 0.48 μm | 2.6 | 1.7 | 3.0 | 3.7 | 3.3 |

As indicated in Table 4, as compared to Comparative Example 6, in which no surfactant was used, in Examples 26 to 28, in each of which an anionic surfactant with a contact angle of larger than 10 degrees with respect to the gold electrode with RA 0.04 μm was used, the bleed ratio was reduced in both cases of the gold electrode with Ra 0.04 μm and the gold electrode with Ra 0.48 μm and thus, it was confirmed that bleeding tends not to occur. Furthermore, under all conditions, the higher the roughness Ra of the gold electrode, the higher the bleed ratio. In Comparative Example 5, in which a nonionic surfactant with a contact angle of smaller than 10 degrees with respect to the gold electrode with Ra 0.04 μm was used, the bleed ratio increased and thus worse results were obtained. These results showed that bleeding can be prevented by adding a surfactant with a larger contact angle with respect to the electrode.

Moreover, with respect to the joining strength, a sufficiently high joining strength exceeding 20 MPa was obtained in Examples 26 to 28 as compared to Comparative Example 6, in which no surfactant was added.

The metal powder sintering pastes of the present embodiments can be used, for example, for producing heat-resistant power wiring, component electrodes, die attaches, microbumps, flat panels, solar wiring, etc., for wafer bonding, and for producing electronic components that are produced using these in combination. Furthermore, the method of producing a conductive material of the present embodiment also can be used, for example, for producing a light-emitting device in which a light-emitting element such as LED or LD is used.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A metal powder sintering paste, the paste comprising, as a principal component, silver particles having a median diameter of 0.3 μm to 5 μm, and further comprising an anionic surfactant, and being substantially free from resin, wherein
the surfactant is one in which when the temperature is increased with thermogravimetric-differential thermal analysis (TG-DTA) from room temperature to 350° C. at 2° C./min, a residue is reduced to not more than 20% by mass with respect to the initial mass, and
wherein
a content of the surfactant is not more than 2% by mass with respect to the paste.

2. The metal powder sintering paste according to claim 1, wherein
the surfactant is a saturated carboxylic acid represented by Formula (I) below:

$$R^1O(CH_2CH(R^2)O)_{n1}CH_2COOR^3 \quad (I)$$

wherein $R^1$ is a linear or branched alkyl group having at least 7 carbon atoms,
$R^2$ is any one of —H, —CH$_3$, —CH$_2$CH$_3$, and —CH$_2$CH$_2$CH$_3$,
$R^3$ is —H or alkali metal, and
n1 is in a range of 2 to 5.

3. The metal powder sintering paste according to claim 1, wherein
the surfactant is liquid at 25° C.

4. The metal powder sintering paste according to claim 1, wherein
the silver particles are in a flake form.

5. The metal powder sintering paste according to claim 1, wherein
in the silver particles, the content of particles with a particle diameter of smaller than 0.3 μm is not more than 5% by mass.

6. The metal powder sintering paste according to claim 5, wherein
in the silver particles, the content of particles with a particle diameter of smaller than 0.5 μm is not more than 15% by mass.

7. The metal powder sintering paste according to claim 1, wherein
the metal powder sintering paste further comprises an organic solvent as a dispersion medium.

8. The metal powder sintering paste according to claim 7, wherein
the organic solvent has a boiling point in a range of 150 to 250° C.

9. The metal powder sintering paste according to claim 1, capable of being sintered to form a conductive material having an electric resistance of not higher than 6 μΩ·cm.

10. The metal powder sintering paste according to claim 1, wherein
the content of the silver particles is at least 70% by mass with respect to the paste.

11. A metal powder sintering paste,
the paste comprising, as a principal component, silver particles having a median diameter of 0.3 μm to 5 μm, and
further comprising an anionic surfactant, and being substantially free from resin,
wherein
a content of the surfactant is not more than 2% by mass with respect to the paste, and
wherein
a bleed ratio is less than 1.70,
wherein the bleed ratio is calculated as a ratio of a diameter after bleeding to an original diameter of the paste
when the paste is applied onto a substrate having a gold electrode with a surface roughness Ra of 0.04 μm on its surface by a stamping method to have a diameter of 170±50 μm, which then is left to stand for 20 minutes, and
the diameter after bleeding is measured by measuring the diameter including a dispersion medium that had bled.

12. The metal powder sintering paste according to claim 11, wherein
the surfactant is one in which when the temperature is increased with thermogravimetric-differential thermal analysis (TG-DTA) from room temperature to 350° C. at 2° C./min, a residue is reduced to not more than 20% by mass with respect to the initial mass.

13. The metal powder sintering paste according to claim 11, wherein
the surfactant is a saturated carboxylic acid represented by Formula (I) below:

$$R^1O(CH_2CH(R^2)O)_{n1}CH_2COOR^3 \qquad (I)$$

wherein $R^1$ is a linear or branched alkyl group having at least 7 carbon atoms,
$R^2$ is any one of —H, —CH$_2$CH$_3$, and —CH$_2$CH$_2$CH$_3$,
$R^3$ is —H or alkali metal, and
n1 is in a range of 2 to 5.

14. The metal powder sintering paste according to claim 11, wherein
the surfactant is liquid at 25° C.

15. The metal powder sintering paste according to claim 11, wherein
the silver particles are in a flake form.

16. The metal powder sintering paste according to claim 11, wherein
in the silver particles, a content of particles with a particle diameter of smaller than 0.3 μm is not more than 5% by mass.

17. The metal powder sintering paste according to claim 16, wherein
in the silver particles, a content of particles with a particle diameter of smaller than 0.5 μm is not more than 15% by mass.

18. The metal powder sintering paste according to claim 11, wherein
the metal powder sintering paste further comprises an organic solvent as a dispersion medium.

19. The metal powder sintering paste according to claim 18, wherein
the organic solvent has a boiling point in a range of 150 to 250° C.

20. The metal powder sintering paste according to claim 11, capable of being sintered to form a conductive material having an electric resistance of not higher than 6 μΩ·cm.

21. The metal powder sintering paste according to claim 11, wherein
a content of the silver particles is at least 70% by mass with respect to the paste.

22. A method of producing the metal powder sintering paste according to claim 1, comprising mixing an anionic surfactant and silver particles having a median diameter of 0.3 μm to 5 μm together but substantially not with resin.

23. A method of producing a conductive material, comprising a step of calcining a metal powder sintering paste according to claim 1.

24. The method of producing a conductive material according to claim 23, wherein
the calcining is carried out at a temperature in a range of 160° C. to 300° C.

25. The method of producing a conductive material according to claim 23, wherein
the calcining is carried out in an air oven at 160° C. to 250° C. for 30 to 120 minutes.

* * * * *